United States Patent [19]
Martin

[11] Patent Number: 5,907,402
[45] Date of Patent: May 25, 1999

[54] MULTIOSCILLATOR RING LASER GYRO USING COMPENSATED OPTICAL WEDGE

[76] Inventor: Graham J. Martin, Litton Systems Inc., Guidance & Control Division, Mail Stop, 5500 Canoga Ave., Woodland Hills, Calif. 91367

[21] Appl. No.: 07/478,394

[22] Filed: Feb. 12, 1990

[51] Int. Cl.⁶ .................................................. G01C 19/64
[52] U.S. Cl. ............................... 356/350; 372/33; 372/94
[58] Field of Search .............................. 356/350; 372/33, 372/94

[56] References Cited

U.S. PATENT DOCUMENTS

3,854,819  12/1974  Andringa ................................. 356/350

Primary Examiner—Vincent P. McGraw
Attorney, Agent, or Firm—Roy L. Brown

[57] ABSTRACT

A multioscillator ring laser gyro having a Faraday Cell with an optical wedge in one of its branches. Variations in the MCDL of the optical wedge with temperature are reduced to substantially zero. The internally specularly reflected and backscattered beams from said primary beam have path lengths such that the internally double-bounced reflected and scattered beams of each mode have path lengths wherein the differences between the mode directions are adjusted in a particular manner to reduce cyclic variations with temperature in MCDL substantially to zero.

4 Claims, 7 Drawing Sheets

MULTIOSCILLATOR RING LASER GYRO USING COMPENSATED OPTICAL WEDGE

BACKGROUND OF THE INVENTION

1. Field of the Invention

This invention pertains to multioscillator ring laser gyros and particularly to an optical wedge used in a Faraday Cell therein.

2. Description of Related Art

The optical wedge is used in Faraday Cells in multioscillators. Preferably the path of the multioscillator is a rectangle, usually substantially square, that is folded about a diagonal into two planes. It should be noted, however, that some multioscillators have other than four path legs and mirrors and may be planar, and the invention using the corrected optical wedge described and claimed herein contemplates its use in such other ring lasers.

In this application, a "mode" is defined as a primary beam of a multioscillator ring laser gyro, plus two reflected double bounce beams produced inside an optical wedge by such primary beam. Thus, each multioscillator ring laser has four modes. Energizing the ring laser creates four primary beams, and they are resonant within the laser cavity. The two double-bounce beams of each of the modes are reflected and scattered beams within an optical wedge of a Faraday Cell, and they have very little energy compared to the energy in the primary beam because most of the beam is transmitted at the wedge-to-gas interface. The double-bounce beams create significant errors when the multioscillator is used to sense angular position, despite their low energy content.

The four primary beams of a multioscillator ring laser gyro may be slightly elliptically polarized, but with that understanding of their exact nature, for convenience let them be be described as circularly polarized. Polarize two of the primary beams with one polarity direction, and the other two beams with the other polarity direction. At each corner mirror of the ring laser, the polarity direction of each primary beam reverses, but since all beams reverse polarity it produces no confusion to ignore the polarity reversal.

Two of the primary beams traverse the ring laser in one direction, and the other two primary beams traverse the ring laser in the other direction. Arbitrarily designate the directions clockwise and counterclockwise. The primary beam combinations are arranged such that for each polarization polarity there is both a clockwise and an anticlockwise beam.

As a result of a nonplanar geometry and/or optical components such as a Faraday wedge, the beams are further displaced in frequency, one from another. The ring laser gain medium is capable of sustaining oscillations over a band of frequencies, and the four frequencies are within that band. The oscillations are produced by various means (not shown). For example, the oscillations may be produced by an electric d.c. gradient between a cathode and anode through part of the laser path; or the oscillations may be produced by an electromagnetic radio frequency field acting on a gas such as a neon gas mixture within a portion of the ring laser path. Designate the excitation region of the path the "gain bore".

In a multioscillator there operate two gyros. Two of the oppositely propagating beams produce signals for one gyro, and the other two oppositely propagating beams produce signals for the other gyro.

Because the two frequencies of each gyro do not coincide in the presence of zero angular velocity about the sensing axis of the gyro, each gyro is frequency biased. As the measured angular velocity increases, the two frequencies of one of the gyros diverge, and the two frequencies of the other of the gyros converge. The differences in sense of polarization allow the two gyro signals to be identified and converted into electrical signals which are measures of sensed angular velocity.

The output signal of a ring laser gyro is a heterodyne signal between the optical frequencies of the two beams comprising that gyro. The bias frequency is subtracted out, and the difference is proportional to the measured angular velocity. The use of a multioscillator avoids certain problems such as frequency locking of the two frequencies of the primary beams of a gyro when their difference frequency is small.

Designate the four beams herein, from lowest frequency to highest frequency, left circularly polarized anticlockwise, "La," left circularly polarized clockwise, "Lc," right circularly polarized clockwise, "Rc," and right circularly polarized anticlockwise, "Ra" beams.

There are means for extracting the beams and beating them against each other to produce signals which are a measure of angular velocity. For example, a portion of the two beams may be extracted and the extracted beam or beams folded and superimposed to produce fringes which are readily countable as they move across an optical field. It is most convenient to use the Lc, Ra beams for one gyro and the La, Rc beams for the other gyro.

There are three types of differential losses among the four lasing modes of a multioscillator ring laser gyro. When the left-circularly polarized modes (La, Lc) suffer different round-trip cavity loss from the right-circularly polarized modes (Ra, Rc) the differential loss is called, "differential polarization loss" (DPL).

When the clockwise modes (Lc, Rc) suffer different round-trip cavity loss from the anticlockwise modes (La, Ra) the differential loss is called, "differential directional loss" (DDL).

When the modes of one helicity (La,Rc) suffer different round-trip cavity loss than the modes of the other helicity (Lc,Ra) the differential loss is called, "magnetic circular dichroic loss" (MCDL).

Of the three types of loss, the multioscillator frequency bias is most sensitive, perhaps by a factor of a thousand, to MCDL. The operation of the invention could be used to reduce DDL and DPL, but for the best performance improvement in the multioscillator gyro, it is used to reduce MCDL.

Change in MCDL with temperature variation causes unwanted change in the multioscillator ring laser gyro frequency biases. Some of the frequency bias changes are such that their amplitudes vary monotonically with temperature, but others cycle, varying first upward or downward with changed temperature, then changing direction as the temperature further changes.

One possible way of removing all the differential loss effects (DPL, DDL and MCDL) caused by the double-bounce beams in the wedge would be to arrange the first and second double-bounce beams always to be anti-phased so their phasor sum is zero. In practice this is not likely because the scatter and reflection amplitudes from the two Faraday wedge faces are not equal, and because selection of the differential phase shifts between the two wedge faces, for scattering and reflection, likely cannot be guaranteed. Faraday-wedge fabrication techniques are believed not available to achieve the required accuracy.

SUMMARY OF THE INVENTION

The apparatus of this invention could have been designed to cause the DDL and DPL to disappear (both disappear together), but the reduction or disappearance of the MCDL is many times more important to the operation of the multioscillator ring laser gyro.

The reduction is achieved by choosing the combination of wedge angle of the optical wedge, orientation of the wedge, thickness of the wedge, and tilt angle of the wedge within the ring laser cavity. Since the multioscillator frequency bias is very sensitive to MCDL, but much less so to DDL and DPL, it is a feature and object of this invention to configure a wedge, position it and orient it in a Faraday Cell in a multioscillator to reduce and substantially remove the cyclic variation of the MCDL with temperature.

Cyclic changes of the ring laser frequency bias with temperature can be caused by optical scatter in the resonant laser cavity between the various intracavity surfaces. The mirrors and the faces of the optical wedge in the Faraday Cell produce these resonant scatter effects which introduce errors into the gyro, causing the output signal of the gyro to vary cyclically with peak-to-peak values that depend inversely with the magnitude of the optical rotation produced by the Faraday Cell. These kinds of effects are not addressed by the invention.

The cyclic changes in the multioscillator ring laser gyro frequency bias with temperature can be caused by a cyclic variation of the cavity MCDL with temperature from interference produced by the wedge. These MCDL effects are non-resonant in the cavity and their magnitudes are directly proportional to the magnitude of the optical angular rotation produced by the Faraday cell.

This invention configures the dimensions, angular orientation and position of the wedge within the laser path to minimize the peak-to-peak amplitude of the cyclic frequency bias fluctuations caused by MCDL.

As the beams propagate around the ring laser cavity and travel through the wedge, they scatter and reflect at the wedge-to-gas surfaces of the wedge. Thus, a variety of weakly scattered and reflected beams have multiple bounces within the wedge and leave its surfaces. For each of the four modes produced within a multioscillator ring laser, this invention concerns only three beam fractions leaving the wedge in the intended direction of travel.

The three considered beams are described for only one mode. The strongest beam is the primary beam which leaves the wedge after a single pass, slightly displaced and redirected from its original direction. The other two beams, designated the first and second double-bounce beams, contain very much less of the mode's energy than does the primary beam.

The first double-bounce beam is created where the primary beam is specularly reflected at the wedge-to-gas interface. It traverses the wedge a second time in a substantially reversed direction, is scatter-reflected at the wedge-to-gas interface through an angle equal to twice the wedge angle, traverses the wedge for a third time and leaves in a direction substantially parallel to the primary beam but displaced from it by a small fraction of beam diameter.

The second double-bounce beam is created where the primary beam is scatter-reflected at the wedge-to-gas interface at an angle equal to twice the wedge angle. It traverses the wedge for a second time in a substantially reversed direction, is specularly reflected at the wedge-to-gas interface, traverses the wedge for a third time and leaves the wedge in a direction substantially parallel to the primary beam and the first double-bounce beam but displaced by a small fraction of the beam diameter from both. Thus, the first double-bounce beam is first reflected then scattered; the second double-bounce beam is first scattered then reflected.

All other multiple-bounce beams are several orders of magnitude smaller in amplitude than the three beams mentioned above.

As the four multioscillator ring laser modes travel through the wedge, each creates the two double-bounce beams. Upon leaving the wedge, each mode now comprises a phasor sum of its primary beam and its first and second double-bounce beams. Whereas the amplitudes of each of the three beam parts for one mode are sustantially equal to the amplitudes of the corresponding beam parts for the other modes and are not subject to changes with temperature, the same is not true for their respective phases. The phases depend on the optical path length traversed, which is different for each beam of each mode; the amount of Faraday rotation per unit length imparted by the wedge material and field of the Faraday element, which depends on the mode polarization type; and the phase shift produced as each beam is scattered and reflected, which depends upon the position on the wedge-to-gas wedge interface at which the beam is scattered or reflected. The last-mentioned phase shift varies substantially periodically over the wedge surface. Thus, for any given set of parameters characterizing the dimensions, position, and orientation of the wedge, and the directions of the beams, each beam of the lasing modes experiences a different transmitted fraction, and thus each mode experiences a different effective loss at the wedge. A change in temperature causes both the lengths of the optical paths in the wedge and index of refraction of the wedge to vary. The losses of the modes, relative to each other, change cyclically with the temperature, for it is the phasor sum of the beams of each mode that are considered when calculating the total beam intensity. The total throughput intensity is the square of the phasor sum of the amplitudes of the three beams.

Besides the very small optical wedge angle, the optical wedge is rotated slightly, usually about ten to twelve degrees, about an axis that is perpendicular to the plane of the local light paths, to avoid directing reflections of the beams incident upon the surfaces back along the ring laser bore.

To keep the beams directed substantially along the axes of the ring laser bores, correction for the optical wedge angle and the rotation of the optical wedge may be made by adjusting the position and angle of at least one of the corner mirrors.

To avoid the cyclic variation of the intensity from temperature changes, it is a feature and object of the invention to modify the geometry of the optical wedge as a function of the refractive index, the thickness, the angle, and the tilt angle of the optical wedge to reduce the portions of the MCDL that are cyclic with temperature.

It is therefore an object and feature of this invention to produce a multioscillator ring laser gyroscope whose output signal does not contain cyclic thermal errors.

It is likewise an object and feature of this invention to produce an optical wedge whose MCDL is substantially constant over an extended range of temperatures.

Other objects are apparent from the following description, taken together with the accompanying drawings.

DETAILED DESCRIPTION OF THE INVENTION

Figure 1:
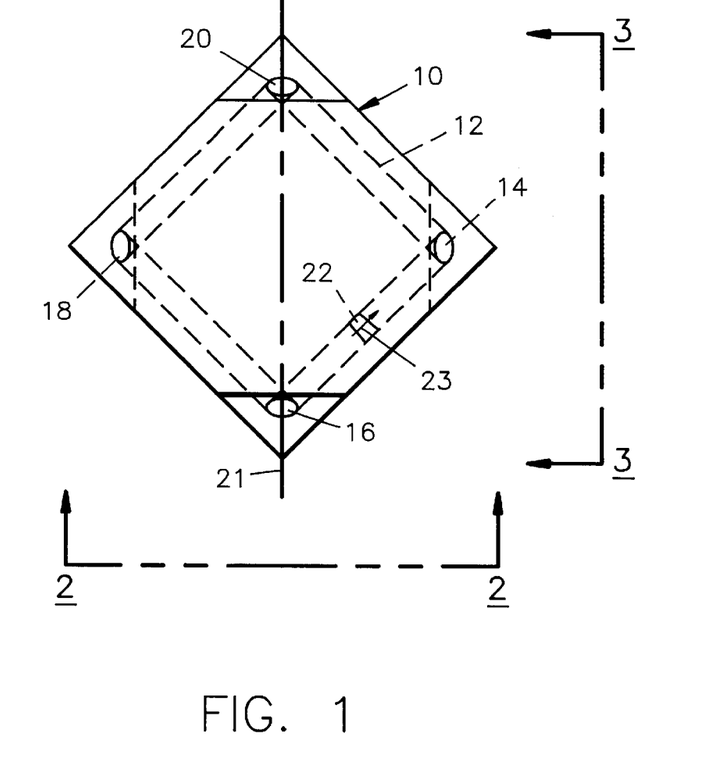
FIG. 1 is a plan view of a multioscillator ring laser gyro, showing an optical wedge for a Faraday Cell, positioned without showing its magnet.

FIG. 1 is a plan view of a ring laser body 10, showing a ring laser bore 12 having four corner mirrors, 14, 16, 18 and 20. The optical wedge 22 is positioned in one of the legs of the laser bore 12.

Figure 1A:
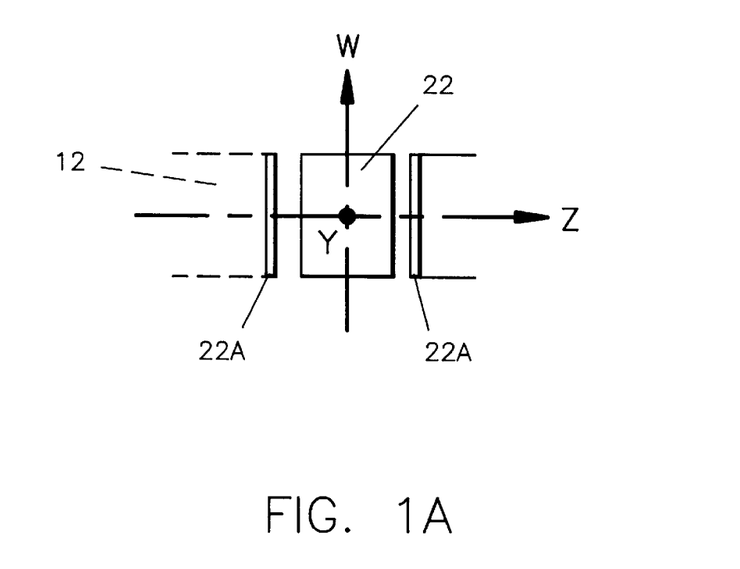
FIG. 1A is an expanded view of the portion of FIG. 1 in the region of the prism 22, showing a wedge with typical magnets, and showing a wedge coordinate system.

A pair of magnets 22A, associated with the optical wedge 22 to make a Faraday cell, are shown in FIG. 1A. FIG. 1A also shows a cartesian axes set, w, y, z for defining the orientation of the prism 22 in the bore 12.

Figure 2:
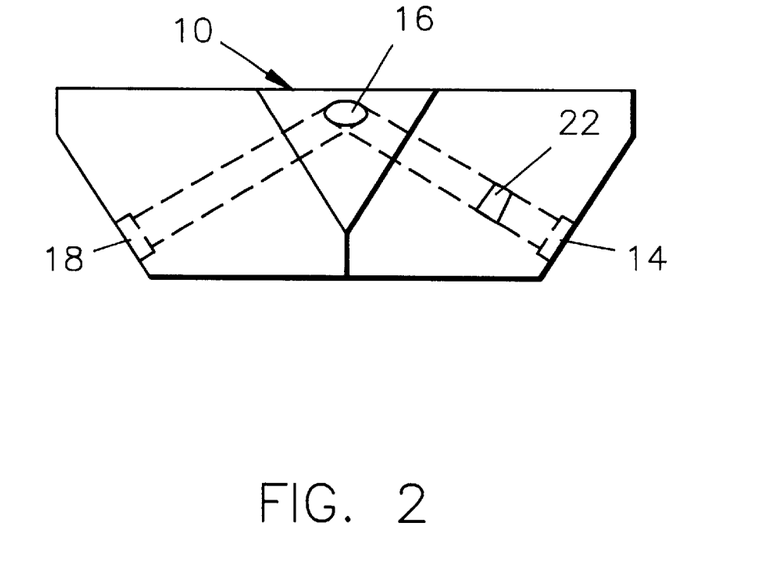
FIG. 2 is a view, taken at 2—2 in FIG. 1, showing the slope of a beam plane of a non-planar multioscillator.
Figure 3:
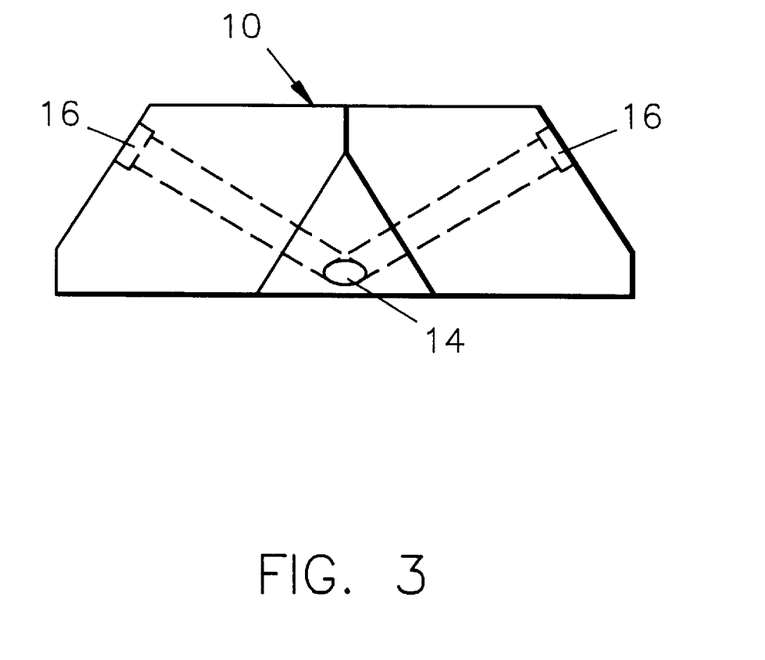
FIG. 3 is a view taken at 3—3 in FIG. 1, showing how the beam path of a non-planar multioscillator ring laser is folded along a diagonal of the path.

FIG. 2 is a view taken at 2—2, and FIG. 3 is a view taken at 3—3 in FIG. 1 to show more clearly a typical ring laser path for a multioscillator non-planar laser gyro. FIGS. 2 and 3 show the bore 12 folded along the diagonal line 21 by tilting the corner mirrors 14, 16, 18, and 20.

Figure 4:
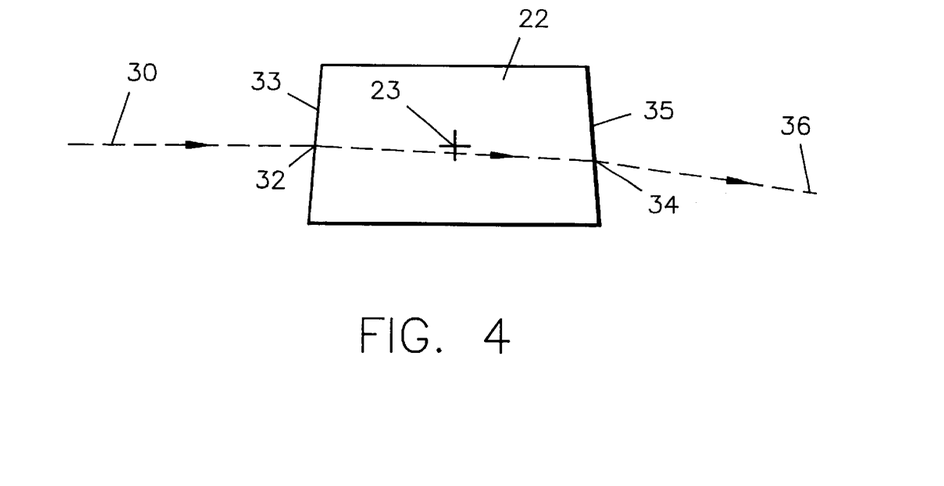
FIG. 4 shows laser beams traveling, with an exaggerated beam bend, through an optical wedge.

FIG. 4 is a schematic diagram of the optical wedge 22. The angles are exaggerated to show bending of a laser beam through the optical wedge. The shown optical wedge angle between the faces is exaggerated, and in practice is on the order of about ten minutes of arc. Although the entire optical wedge is typically rotated on the order of ten degrees about axis 23, no rotation is shown in these figures, and such rotation is discussed below.

A ring laser used as an angular rate sensor or laser gyro has useful or primary beams propagating in both directions around the ring. There are two primary beams propagating in each direction in the multioscillator for a total of four modes. Associated with each primary beam are two additional double-bounce beams which are modified, according to this invention, to reduce or eliminate their interference with the operation of the multioscillator. Thus, each of the four multioscillator modes has three beams: a primary beam and two double-bounce beams.

A left-to-right or anticlockwise beam is shown in FIG. 4, but no clockwise beam is shown. Because the interaction between a beam and the optical wedge 22 is substantially the same for both beam directions, only FIG. 4 is explained.

The arriving primary beam 30 enters the optical wedge 22 at a gas-to-wedge port 32 on a first surface of the optical wedge. The beam is re-directed within the optical wedge 22, and it is again redirected at the wedge-to-gas port 34 into primary beam 36.

Figure 5:
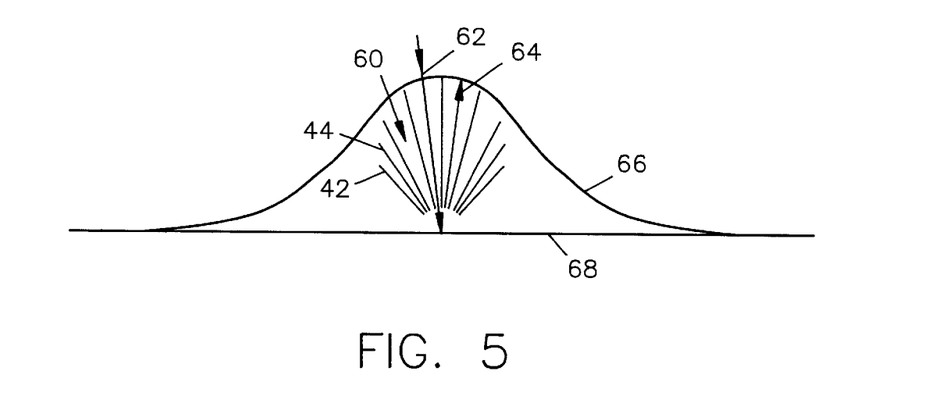
FIG. 5 is a diagram showing the back-scattering of light incident upon a surface.

FIG. 5 shows how a beam is backscattered when it strikes a reflective surface. The shown backscatter pattern is experienced when an incident beam 62 strikes the reflective surface 68 straight on. In the operation of the apparatus of this invention, the incident beam is only a small angle from a normal to surface 68, and the difference, in the example, may be ignored. When the beam 62 is scattered, only a portion 64 of the scattered beams is directed in the direction to affect MCDL and to interfere with the gyro operation.

Figure 6:
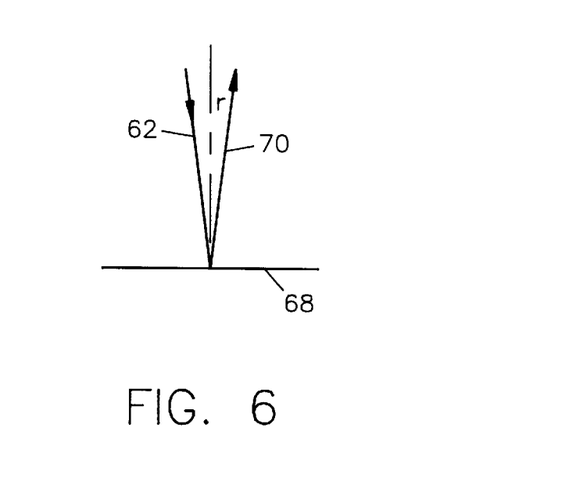
FIG. 6 is a diagram showing specular reflection of light from a surface.

FIG. 6 shows a specular reflection 70 of incident beam 62 from the reflective surface 68. The angle of incidence, "i" is equal to the angle of reflection, "r."

Figure 7:
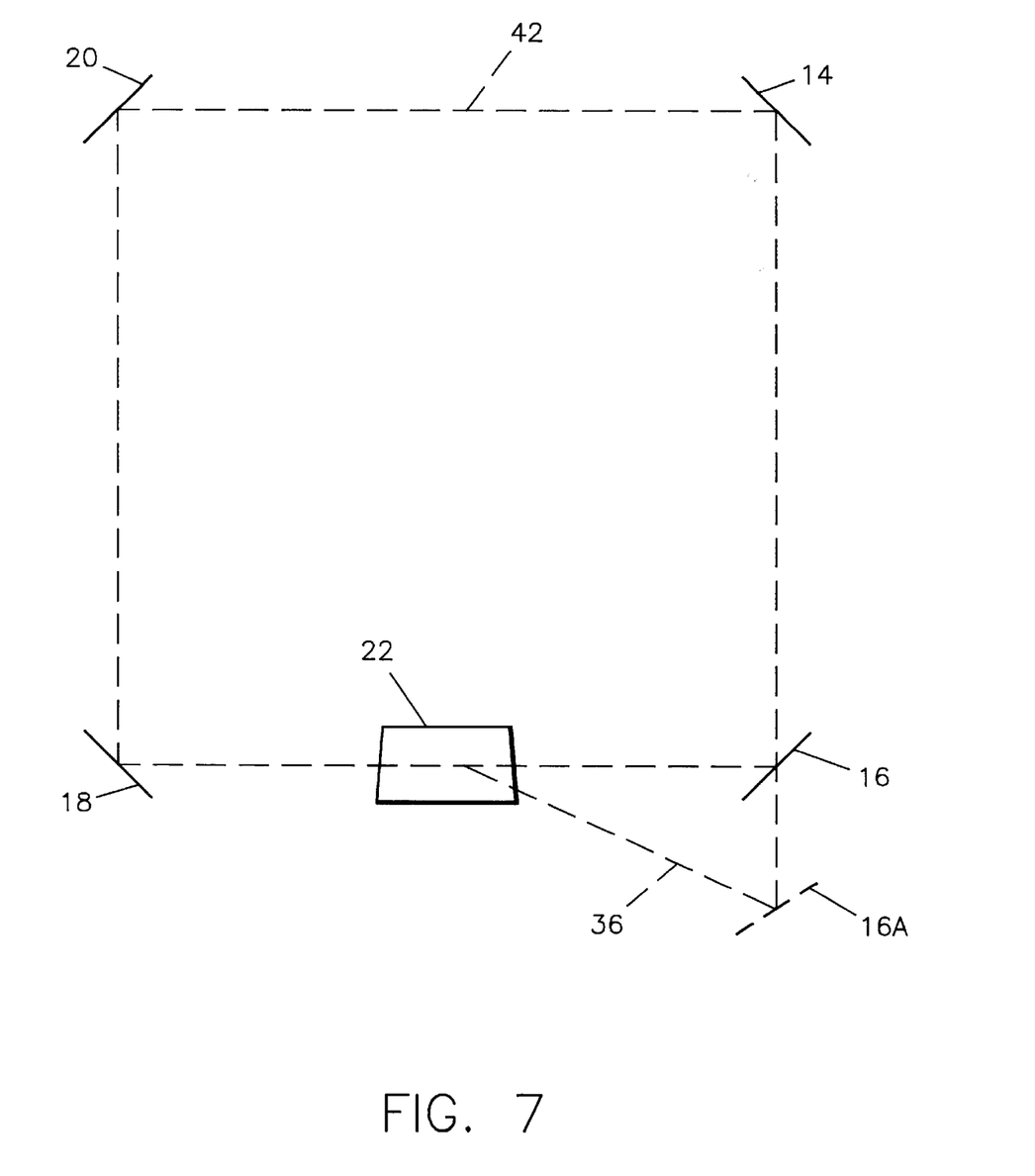
FIG. 7 is an exaggerated schematic diagram showing how a corner mirror translates and rotates to compensate for light bending through an optical wedge.

In FIG. 7, it is shown at 36 that the beam is deflected downward. If there is no correction for that downward deflection, the beam would traverse around the ring laser, eventually entirely missing the corner mirrors 14, 16, 18, 20.

The optical wedge distorts the beam from the path that would have been taken in an empty cavity. Deflection of the beam is shown in exaggerated form at 36. To compensate for the deflection of the beam 36, the corner mirror is tilted and rotated. The translated and tilted mirror is shown in dashed lines at 16A.

Figure 8A:
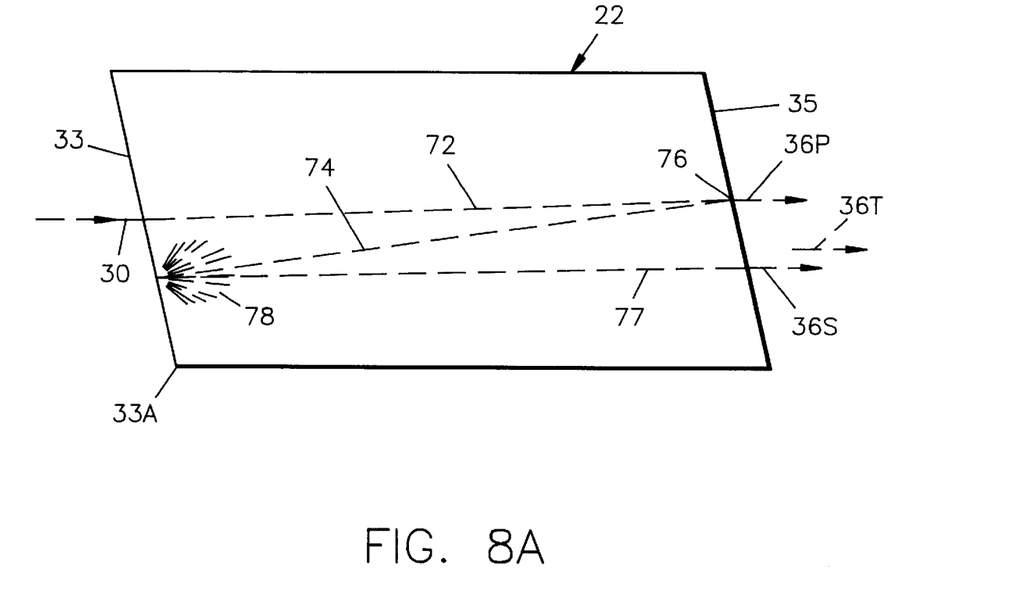
FIG. 8A is a beam diagram through the optical wedge, showing entrance of a beam at a first gas-to-wedge surface, specular reflection at a second wedge-to-gas surface and back-scatter of the reflected beam at the first wedge-to-gas surface.
Figure 8B:
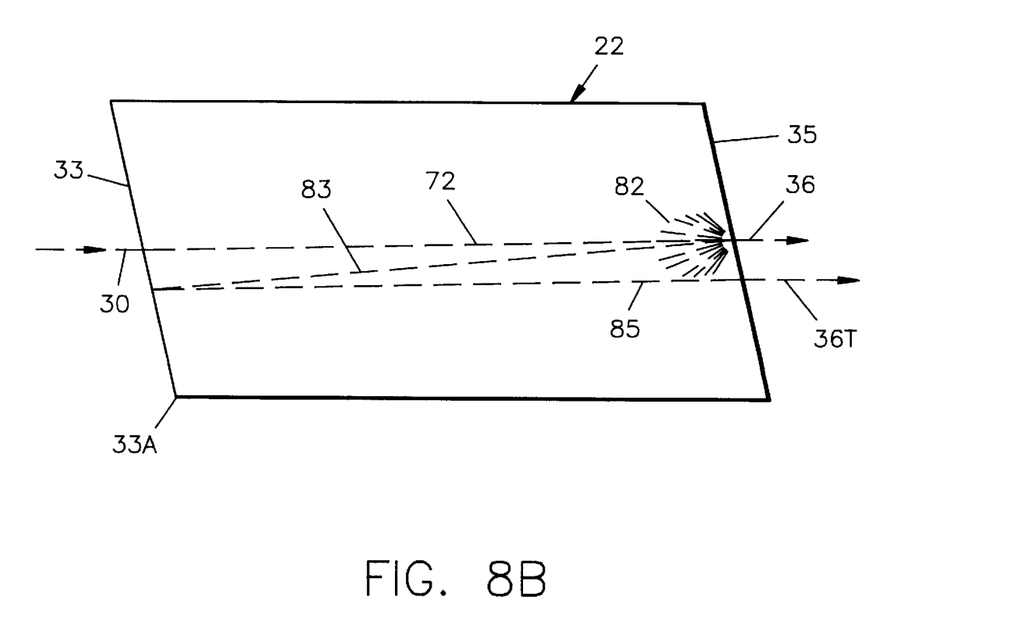
FIG. 8B is a beam diagram through the optical wedge, showing entrance of a beam at a first gas-to-wedge surface, back-scatter at a second wedge-to-gas surface, and specular reflection of selected back-scatter beams at the first wedge to gas surface.

FIGS. 8A and 8B show the various compensated beams in this invention. The important beams in the explanation are the incident beam 30, the transmitted beam 72, the primary departing beam 36P, the specularly reflected beam 74, the scattered beams 78, a particular scattered beam 77, the first double-bounce departing beam 36S, the scattered beams 82, a particular scattered beam 83, the specularly reflected beam 85, and the second double-bounce departing beam 36T.

To explain the invention, the optical wedge is shown with an optical wedge angle between its two incident faces 33, 35 of about five degrees. In practice, the optical wedge angle would be more on the order of four to ten arc minutes.

Further, in a preferred embodiment, to reduce interfering reflections of the incident beams 30, from the faces 33, 35, such faces are typically turned approximately five to twelve degrees about an axis in the w-y plane (FIG. 1A).

The incoming beam 30 is reflected and scattered from the gas-to-wedge surface 33, but such reflections are not directed along the laser bore, and they do not interfere with the operation of the laser gyro.

The beam 30 also penetrates the surface 33 and, because of the changed index of refraction, is angularly deflected. Such beam is transmitted through the optical wedge 22 to wedge-to-gas surface 35. The primary beam 36P is deflected and leaves the optical wedge 22.

A part of the beam 72 (usually less than 0.01 percent) is specularly reflected by the optical wedge boundary at wedge-to-gas surface 35.

The reflected beam 74 (FIG. 8A) is further reflected at the wedge-to-gas boundary 33. The scattered beams 78 have a few rays which form a beam 77 to the surface 35. That last-named beam penetrates the surface 35 to form a first double-bounce beam 36S parallel to the primary beam 36P. Because the optical wedge thickness is only about one or two millimeters, the primary and first double-bounce beams mostly overlap.

The beam 72 is also scattered at the wedge-to-gas surface 35 to produce the beam pattern shown at 82 (FIG. 8B). A few of those rays form a beam 83 that is at the specific angle to affect the ring laser gyro. Beam 83 intercepts wedge-to-gas surface 33 where part is specularly reflected and propagates back to surface 35 which it penetrates to form a second double-bounce beam 36T which is slightly displaced from and substantially parallel to the primary beam 36P. Because of the small thickness of the optical wedge, the beam 36T substantially overlies the beams 36P and 36S. The beams 36P, 36S and 36T are the significant beams of the mode 36.

Figure 9:
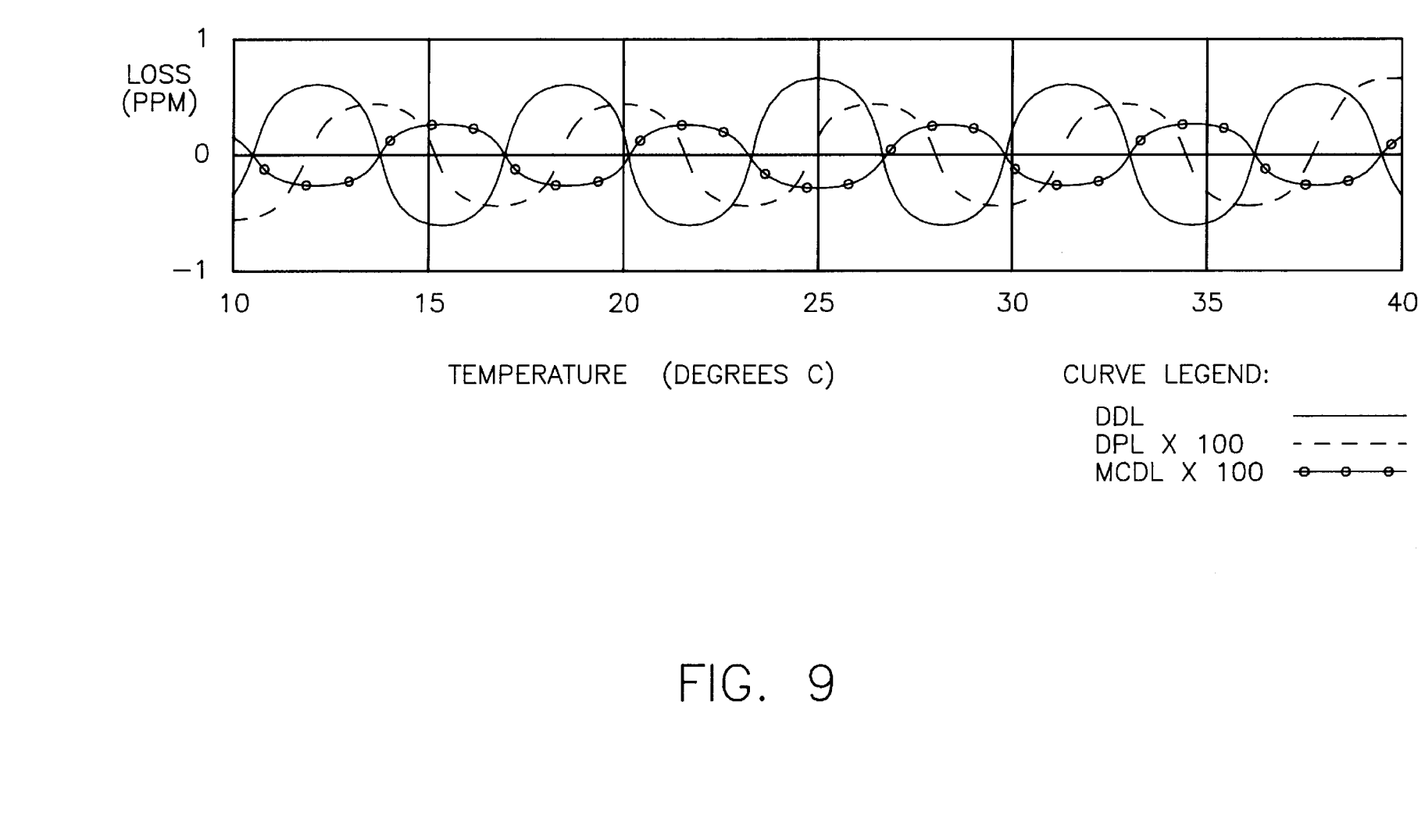
FIG. 9 is a graph depicting the Loss in a typical optical wedge, showing DDL, DPL and MCDL losses as a function of temperature.

FIG. 9 shows generically how the MCDL, DDL and DPL change with temperature of the Faraday wedge for a particular selection, chosen from a limited random sample, of the configuration parameters for the wedge. Note how all three losses vary cyclically with temperature. They are substantially sinusoidal with substantially the same period but not in phase.

FIG. 9 was produced from a computer which calculated the paths of the twelve beams of the four modes which would circulate through the wedge. The phasor sum of the three beams for each of the four modes was calculated and plotted. The mode differential losses were then calculated and plotted. The following wedge parameters were used for the calculation.

| | | |
|---|---|---|
| Refractive Index of the wedge | 1.83957 | |
| Thickness of the wedge | 40 | mils |
| Wedge angle between opposing faces of the wedge was | 4.5 | arcminutes |
| Wedge orientation | −16.229 | degrees |
| Tilt axis, relative to the direction of the w and y axes, about the z axis | −185.637 | degrees |
| Tilt Angle about an axis in the w-y plane | −6 | degrees |
| Differential Scatter Phase between $\phi_1$ and $\phi_2$ equals 0 degrees where $\phi_1$ and $\phi_2$ = scatter phase shifts at the two wedge faces for the clockwise beams. | | |

The plot and the parameters are by way of example only, and they are not to be restrictive on the invention.

Figure 10:
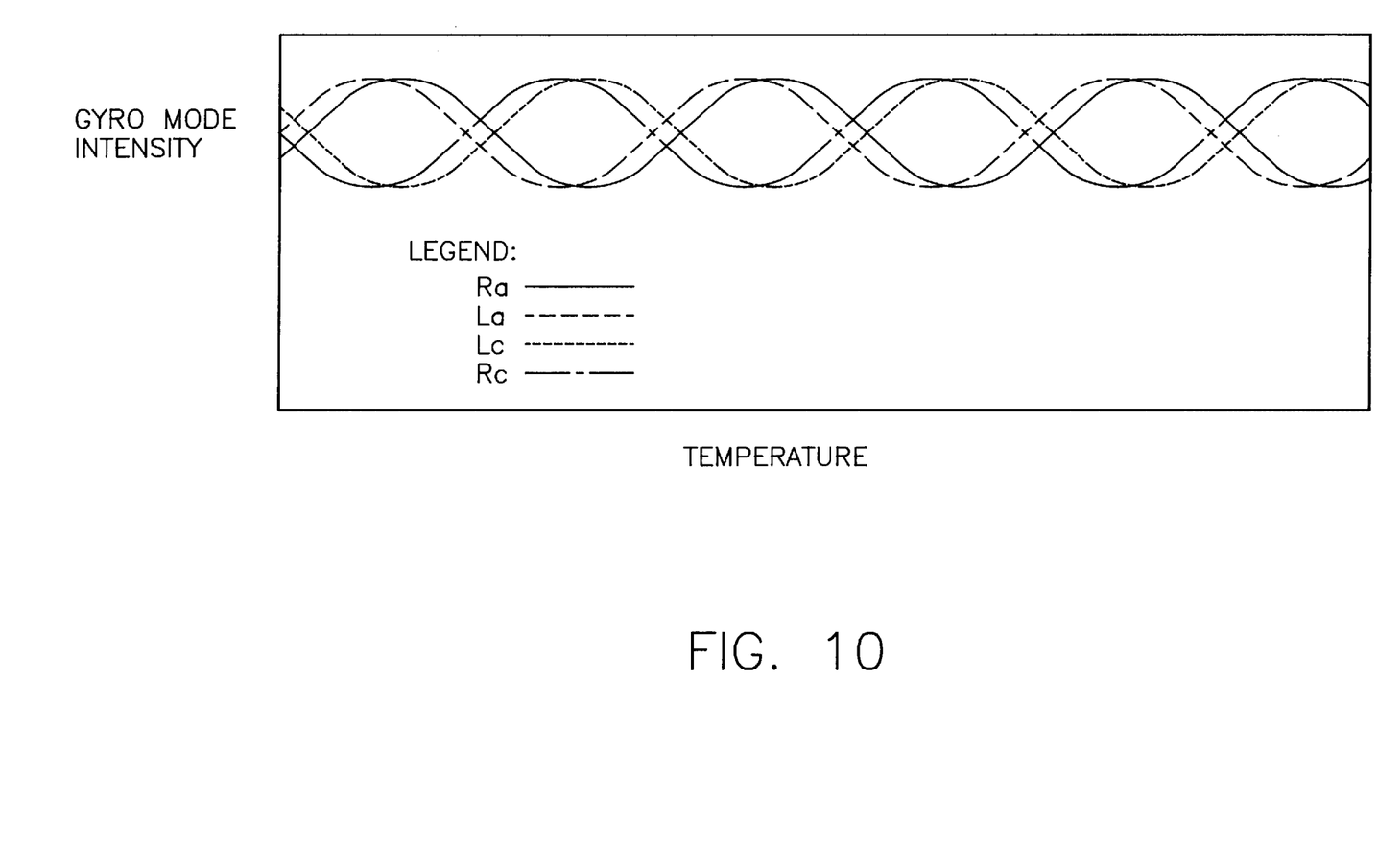
FIG. 10 is a graph of multioscillator mode intensity as a function of temperature, showing how the effects of MCDL cancel.

FIG. 10 is a plot of the individual mode intensities, as a function of temperature, after the wedge was corrected, according to this invention, to make the MCDL substantially constant. FIG. 10 demonstrates how the configuration of this invention arranges the phases of the double-bounce beams, by making the MCDL substantially constant, so that the La and Rc mode-intensity variations are 180 degrees out of phase as are the intensities of the Lc and Ra mode-intensity variations. Because the variations of the mode intensities are held opposite in phase, the La, Rc mode sum and the Lc, Ra mode sum are always constant during changes in temperature, so any normally-occuring phase shift in the cyclic behavior with temperature between the La,Rc pair and the Lc,Ra pair has no effect.

The intensity fluctuations shown in FIG. 10 for the individual modes have the forms:

Lc→R2S1 cos (x+$\phi_1$−$\delta$)+S2R1 cos (x+$\phi_2$−$\delta$)

Rc→R2S1 cos (x+$\phi_1$+$\delta$)+S2R1 cos (x+$\phi_2$+$\delta$)

La→R1S2 cos (x+$\Delta$x+$\phi_2$+$\Delta\phi$+$\delta$)++S1R2 cos (x+$\Delta$x+$\phi_1$+$\Delta\phi$+$\delta$)

Ra→R1S2 cos (x+$\Delta$x+$\phi_2$+$\Delta\phi$−$\delta$)++S1R2 cos (x+$\Delta$x+$\phi_1$+$\Delta\phi$−$\delta$)

where

R1,R2=reflection amplitudes at the two wedge faces

S1,S2=scatter amplitudes at the two wedge faces x=path phase factor for the clockwise beam pair (each approximately equal to the other)

x+$\Delta$x=path phase factor for the anticlockwise beam pair (each approximately equal to the other)

$\phi_1$ and $\phi_2$=scatter phase shifts at the two wedge faces for the clockwise beams $\phi_1$+$\Delta\phi$, and $\phi_2$+$\Delta\phi$ are the scatter phase shifts at the two wedge faces for the anticlockwise beams $\delta$=phase shift from the Faraday effect in the wedge.

In a multioscillator, the cyclic variation of the MCDL is proportional to

[(Lc−Rc)+(Ra−La)]/2.

Whereas the parameters R1,R2,S1,S2, $\phi_1$ and $\phi_2$ cannot reliably be controlled, the other parameters including $\Delta$x and $\Delta\phi$ are functions of geometry of the light path.

The above equations for the individual mode intensities show that for values of ($\Delta$x+$\Delta\phi$) equal to an odd multiple of $\pi$ ($\pi$, 3$\pi$, 5$\pi$, etc.) the mode intensities resemble the plots of FIG. 10, and the cyclic variations in the MCDL disappear. Note that ($\Delta$x) is the difference in beam path phase between the two clockwise double-bounce beams (which have substantially the same path lengths as each other) and the two anti-clockwise double-bounce beams (which also have substantially the same path length as each other). ($\Delta\phi$) is the difference in phase shift experienced on scattering by the first double-bounce beam in one direction and the second double-bounce beam in the other direction.

One set of parameters that satisfies the above conditions and is submitted by way of example is the following.

| | | |
|---|---|---|
| Refractive Index of the wedge | 1.83957 | |
| Thickness of the wedge | 40 | mils |
| Wedge angle between the faces of the wedge | 5.15 | arcminutes |
| Wedge orientation | −16.229 | degrees |
| Tilt axis relative to the direction of the w and y axes about the z axis | −185.637 | degrees |
| Tilt Angle about an axis in the w-y plane. the Y axis | −6 | degrees |

The nulling of MCDL effects using the above parameters is independent of the values of differential scatter phase $\phi_1$−$\phi_2$ and of the values of $R_1$, $R_2$, $S_1$,$S_2$.

If ($\Delta$x+$\Delta\phi$) were to equal an even multiple of $\pi$ (0, 2$\pi$, 4$\pi$, etc.) both the DPL and DDL would disappear, but the MCDL would be maximum.

Fabrication of a Faraday wedge for a precision gyro requires a tolerance on the thickness of about .0025 inches and on the wedge angle of about 6 arcseconds. Better, first manufacture the Faraday wedges to an approximate range of values for thickness and wedge angle. Then measure the values to the above tolerances. The tilt angle and tilt-axis orientation are calculated to make ($\Delta$x+$\Delta\phi$) equal to an odd multiple of $\pi$. It is found that tolerances on the wedge and tilt angles for precision gyros preferably are about 0.1 degrees, and a preferred tolerance of about 5.0 degrees is appropriate for the tilt-axis orientation. The tolerances are relatively easy to achieve.

Thus, the optical wedge has been compensated for internal reflections and scattering, thereby increasing the accuracy of multioscillator ring laser gyros.

I claim:

1. A multioscillator ring laser gyro comprising:

a ring laser block having a multioscillator ring laser path with four lasing modes said modes being substantially circularly polarized with one of each polarity of polarization of said modes (designated Rc,Lc) propagating in a first direction around said ring laser, and one of each polarity of polarization of said modes (designated Ra,La) counterpropagating in a second direction around said ring laser;

a Faraday cell, containing an optical wedge in one leg of said path to intercept counterpropagating ring laser modes;

the refractive index, thickness, wedge angle, wedge orientation, tilt axis orientation, and tilt angle of said optical wedge being chosen to cause the MCDL to remain substantially constant with changes in temperature.

2. A multioscillator as described in claim 1 in which said MCDL remains substantially constant by making the [(Lc−Rc)+(Ra−La)]/2 substantially constant with changes in temperature.

3. A multioscillator as described in claim 1 in which said MCDL remains substantially constant by making [(Lc−Rc)+(Ra−La)]/2 substantially non-cyclic with changes in temperature.

4. A multioscillator as described in claim 2 in which the path length of the first and second double-bounce beams of each mode is adjusted to cause the sum of (1) the difference between the path phase factors for the two directions of propagation through said optical wedge, and (2) the difference between the scatter phase shifts at the two wedge faces for the two directions of propagation through said optical wedge to be equal to substantially odd multiples of $\pi$.

* * * * *